Patented Nov. 21, 1933

1,935,657

UNITED STATES PATENT OFFICE 1,935,657

MANUFACTURE OF NEW DYESTUFFS AND THE APPLICATION THEREOF

Denis Houghton Mosby, Henry Charles Olpin, and George Holland Ellis, Spondon, near Derby, England, assignors to Celanese Corporation of America, a corporation of Delaware No Drawing. Application May 16, 1929, Serial No. 363,707, and in Great Britain June 18, 1928

19 Claims. (Cl. 8—6)

This invention relates to the manufacture of new azo dyestuffs and to the application thereof, and more particularly to their application to materials made of or containing cellulose acetate or other cellulose esters, for instance cellulose formate, propionate or butyrate and the products obtained by the treatment of alkalized cellulose with esterifying agents, (e. g. the products known as "immunized cotton" obtained by treatment with p-toluene sulpho-chlorides) or made of or containing cellulose ethers, for example methyl, ethyl or benzyl cellulose, or the corresponding condensation products of cellulose and glycols or other polyhydric alcohols.

The new azo dyestuffs according to the present invention are prepared by coupling a diazotized 2.4-dinitro-6-alkoxy or alkyl aniline or derivatives thereof with any suitable coupling component.

The new dyestuffs are in general readily dischargeable by any of the ordinary reduction discharges, for example formaldehyde-sulphoxylates or formaldehyde-hydrosulphites, and the invention thus renders available a new range of readily dischargeable dyestuffs, this being more particularly of value in the colouration of cellulose acetate or other cellulose esters or ethers.

As examples of suitable diazo components for use in producing the new azo dyestuffs the following may be mentioned:—

3.5-dinitro-o-anisidine
3.5-dinitro-o-phenetidine
3.5-dinitro-o-toluidine

Any suitable coupling components may be employed, for example aniline, alkyl anilines, amino phenols or their homologues or substitution products or other coupling components of the benzene series, pyrazolones or acetoacetic ester or arylides, but the most valuable dyestuffs are obtained if a coupling component of the naphthalene series is employed, since the shades produced are in general violet to blue in colour, which thus affords a new colour range in readily dischargeable dyestuffs. As examples of these preferred naphthalene coupling components the following may be instanced:—naphthylamines, amino naphthols, alkyl naphthylamines and substitution products thereof, for example 1-amino-2-ethoxy-napthalene. Coupling components containing $\omega$-hydroxy groups, for example $\omega$-hydroxyethyl-$\alpha$-naphthylamine and $\gamma$-chlor-$\beta$-hydroxypropyl-1-naphthylamine (prepared by condensing $\alpha$-naphthylamine and epichlorhydrin), are particularly valuable from the point of view of the shades obtained.

The new azo dyestuffs may contain in addition to the substituents characteristic of the invention additional nitro, alkyl or alkoxy groups, and may further contain any other desired substituent groups, for example amino, alkylamino, carboxy, halogen, hydroxy, mercapto and sulphonic groups.

The new azo dyestuffs may be formed on the fibre or material, or may be prepared in substance. They, and more particularly the unsulphonated azo dyestuffs, are especially of value for dyeing, printing, stencilling or otherwise colouring materials comprising cellulose acetate or other cellulose esters or comprising cellulose ethers, whether such dyestuffs be applied as such or formed on the fibre. The dyestuffs or the components thereof (where the dyestuff itself is to be formed on the material) may be applied to the cellulose esters or ethers in the form of aqueous solutions, for example aqueous solutions of salts, or in the form of aqueous suspensions or dispersions produced by any suitable methods or in any other convenient form. Dispersions of the dyestuffs or components which are insoluble or relatively insoluble in water may be obtained for example, by grinding with or without protective colloids (for instance in the so-called colloid mills), by dissolving in a solvent and mixing the solution with water containing or not containing protective colloids or dispersators, or they may be dispersed by means of dispersators, for example by the methods described in U. S. Patents Nos. 1,618,413, 1,618,414, 1,694,413 and 1,690,481, and 1,716,721 and British Patents Nos. 269,960 and 273,189.

The acid colours obtained according to the present invention are useful for dyeing wool.

As stated above, the new dyestuffs are of particular value for obtaining discharge effects on materials made of or containing cellulose esters or ethers and for this purpose they may be applied to the materials with or without the use of any other dyestuffs dischargeable or otherwise, and having an affinity for the cellulose derivatives or for any fibres used in association therewith, such other dyestuffs being applied before, after, or where possible together with the dyestuffs of the present invention. For the production of discharge effects thereon any suitable reduction discharge may be employed, and with the reducing agent used in the discharge paste or liquor there may be incorporated dyestuffs which resist the discharge agents, for example vat, basic or other colours so as to obtain coloured discharge effects.

Discharge resist effects may be obtained by applying a white or coloured discharge to the materials before the application of the dischargeable dyestuffs.

In addition to their use for the production of self shades the new dyestuffs may be used in conjunction with suitable other dyestuffs for the production of their dischargeable compound shades, such as fawns, greens, blacks, and so forth. If desired any of the new dyestuffs which contain diazotizable amino groups may be diazotized on the fibre and developed with any suitable developer.

The following examples, which illustrate the production in substance and on the fibre of the new dyestuffs and also the production of discharge effects by means of them, are not to be considered as limiting the invention in any way:—

Example 1

2.13 kilos of 3.5-dinitro-o-anisidine are dissolved by warming to 40° C. with 20 kilos of concentrated sulphuric acid, and to this is added a solution of nitrosyl sulphuric acid, previously prepared by dissolving 800 grams of sodium nitrite in 8 kilos of concentrated sulphuric acid, warming slowly to 70–80° C. and cooling to 40° C. After stirring for 1 hour the solution is poured with stirring on to ten times it weight of chopped ice, and stirred for ¼ hour. 2.2 kilos of the product obtained by the condensation of α-naphthylamine and epichlorhydrin (M. P. 249° C. uncorrected) are dissolved in the smallest possible quantity of boiling water and poured on to ice. The diazo solution is now run in, and coupling, which commences immediately in the strongly acid solution, allowed to proceed to completion. The precipitated dyestuff is now filtered, washed first with water and then with dilute alkali until acid free, and kept as an aqueous paste. Applied to cellulose acetate goods by dispersion methods it dyes a bright blue shade, which is dischargeable by the reduction discharge methods.

Example 2

2.13 kilos of 3.5-dinitro-o-anisidine are diazotized as in Example 1 and coupled by running into a solution obtained by boiling 1.43 kilos of α-naphthylamine with 1.7 kilos of 28% hydrochloric acid dissolved in 12.5 litres of water, then diluting to approximately 30 litres and allowing to cool. Coupling takes place in the strongly acid solution, and when complete the dyestuff is filtered, washed acid free, and stored, preferably as an aqueous paste.

Applied to cellulose acetate goods by dispersion methods it dyes a full violet shade, dischargeable by reduction methods. For example, a red discharge print on a violet ground is obtainable by printing cellulose acetate goods previously dyed with 2% of the above dyestuff with the following paste:—

400 grams gum arabic 1:1.
100 grams Durindone Scarlet R. paste.
60 grams anthraquinone 10% paste.
30 grams caustic soda.
10 grams soda ash.
30 grams hydrosulphite.
50 grams methylated spirit.
170 grams water.
150 grams sodium formaldehyde sulphoxylate.

The goods are steamed as necessary, for example in the "cottage steamer" or "rapid ager", and oxidizing for 5 minutes at 50° C. in a bath containing 2.5 grams per litre of bichromate of soda and 5 grams per litre of sulphuric acid (96/98%). They are now soaped lightly, rinsed and dried or otherwise treated as requisite.

Example 3

1.97 kilos of 3.5-dinitro-o-toluidine are diazotized as described in Example 1 for diazotization of dinitro-o-anisidine. The solution thus obtained is now run into a solution of 1.53 kilos of nitro-m-phenylene diamine in 100 litres of water to which sufficient hydrochloric acid has been added to effect solution. Coupling commences immediately, and is facilitated by the addition of sufficient sodium acetate to neutralize mineral acidity. The dyestuff is collected, washed and stored, preferably as an aqueous paste.

Applied to cellulose acetate goods by dispersion methods it dyes a full golden yellow shade.

Example 4

2.27 kilos of 3.5-dinitro-o-phenetidine are diazotized by the method given in Example 1 and run into a solution in 50 litres of water of 3.5 kilos of 1 - amino - 8 - naphthol - 3:6-disulphonic acid mono sodium salt, to which sufficient sodium carbonate has been added to effect solution. Coupling commences immediately, and is completed by the addition of sufficient sodium acetate to neutralize mineral acidity, after which the dyestuff is salted out, filtered, and dried.

Applied to wool from an acid bath it dyes a deep violet shade.

Example 5

Cellulose acetate yarn in hank form is treated with 2% of its weight of α-naphthylamine in the form of a Turkey red oil dispersion produced by known methods. The treatment is carried on at 75° C. for 1 hour or until sufficient naphthylamine has been absorbed.

The yarn is now immersed in a solution of diazotized dinitro-o-anisidine prepared as in Example 1, mineral acidity being neutralized by first adding ¾ of the calculated quantity of sodium bicarbonate and then adding the requisite quantity of sodium acetate, the whole being finally diluted to a 0.5% solution.

Coupling commences immediately and is complete in a short time, the goods progressively assuming a full violet shade. They are now lifted, soaped lightly, rinsed, and dried or otherwise treated as requisite.

What we claim and desire to secure by Letters Patent is:—

1. Azo dyestuffs containing a component of the benzene series in which nitro groups occupy ortho and para positions to the azo group and a radical selected from the group consisting of alkyl and alkoxy the remaining ortho position to said azo group.

2. New azo dyestuffs having the general formula

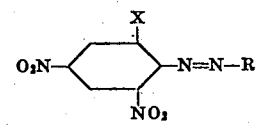

where X is methyl, methoxy or ethoxy and R the residue of a coupling component.

3. New azo dyestuffs having the general formula

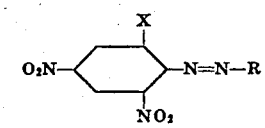

where X is methyl, methoxy or ethoxy and R the residue of a coupling component of the naphthalene series.

4. New azo dyestuffs having the general formula

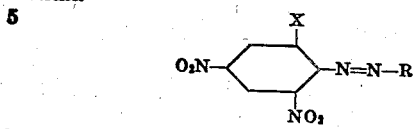

where X is methyl, methoxy or ethoxy and R the residue of a coupling component of the naphthalene series containing an hydroxy alkyl side chain.

5. New azo dyestuffs having the general formula

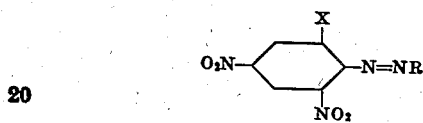

where X is methyl, methoxy or ethoxy and R the residue of a coupling component of the naphthalene series containing an hydroxy alkyl amino side chain.

6. Process for the production of new azo dyestuffs comprising coupling with a coupling component a diazo compound of the benzene series in which nitro groups occupy ortho and para positions to the diazo group and a radical selected from the group consisting of alkyl and alkoxy the remaining ortho position to the said diazo group.

7. Process for the production of new azo dyestuffs, comprising coupling with a coupling component a diazotized amine of the general formula

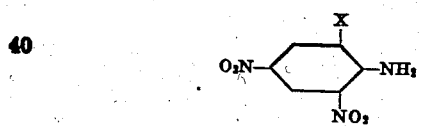

where X is methyl, methoxy or ethoxy.

8. Process for the production of new azo dyestuffs, comprising coupling with a coupling component of the naphthalene series a diazotized amine of the general formula

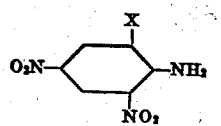

where X is methyl, methoxy or ethoxy.

9. Process for the production of new azo dyestuffs, comprising coupling with a coupling component of the naphthalene series containing an hydroxyl alkyl side chain, a diazotized amine of the general formula

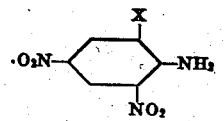

where X is methyl, methoxy or ethoxy.

10. Materials comprising organic substitution derivatives of cellulose coloured with the azo dyestuffs claimed in claim 1.

11. Materials comprising cellulose acetate coloured with the azo dyestuffs claimed in claim 1.

12. Process for colouring materials comprising organic substitution derivatives of cellulose, comprising applying thereto azo dyestuffs as claimed in claim 1.

13. Process for colouring materials comprising cellulose acetate, comprising applying thereto unsulphonated azo dyestuffs as claimed in claim 1.

14. Process for colouring materials comprising cellulose acetate, comprising forming dyestuffs thereon by coupling on the material with a coupling component a diazotized amine of the general formula

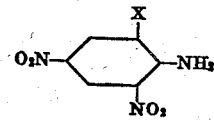

where X is methyl, methoxy or ethoxy.

15. New azo dyestuffs having the general formula

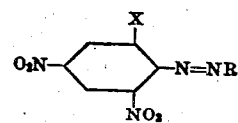

where X is methyl, methoxy or ethoxy and R the residue of a coupling component of the naphthalene series containing an hydroxy alkyl α-amino side chain.

16. Process for the production of new azo dyestuffs, comprising coupling with a coupling component of the naphthalene series containing an hydroxy alkyl amino side chain a diazotized amine of the general formula

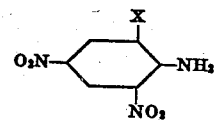

where X is methyl, methoxy, or ethoxy.

17. Process for the production of new azo dyestuffs, comprising coupling with a coupling component of the naphthalene series containing an hydroxy alkyl α-amino side chain a diazotized amine of the general formula

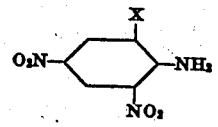

where X is methyl, methoxy, or ethoxy.

18. Process for coloring materials comprising organic substitution derivatives of cellulose, comprising forming dyestuffs thereon by coupling on the material with a coupling component, a diazo compound of the benzene series in which nitro groups occupy ortho and para positions to the diazo group and a radical selected from the group consisting of alkyl and alkoxy ortho to the remaining diazo group.

19. Process for coloring materials, comprising cellulose acetate, comprising forming dyestuffs thereon by coupling on the material with a coupling component, a diazo compound of the benzene series in which nitro groups occupy ortho and para positions to the diazo group and a radical selected from the group consisting of alkyl and alkoxy ortho to the remaining diazo group.

DENIS HOUGHTON MOSBY.
HENRY CHARLES OLPIN.
GEORGE HOLLAND ELLIS.